F. BOOTH.
COMBINATION TIRE RACK AND CHANGER.
APPLICATION FILED OCT. 11, 1920.
1,418,279.
Patented June 6, 1922.
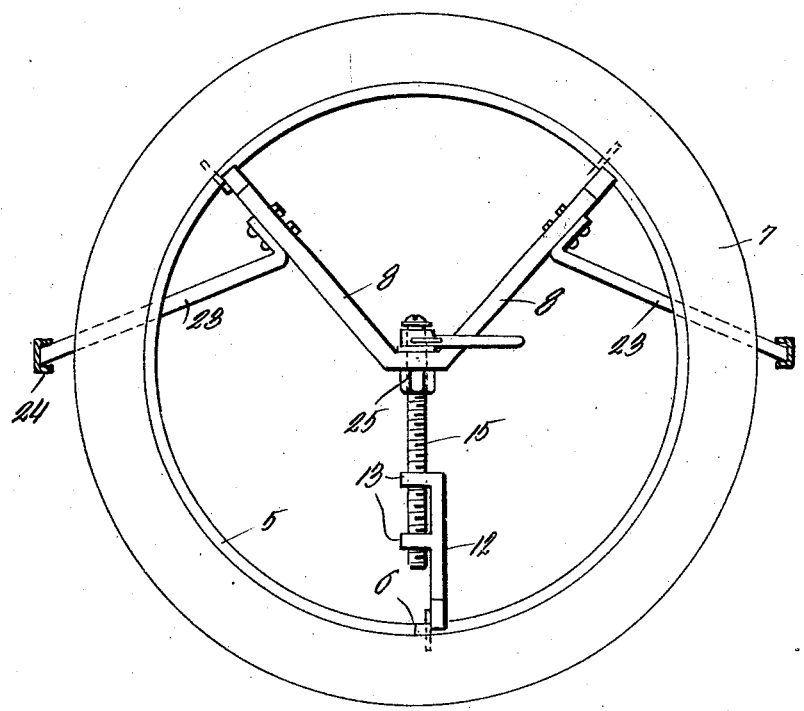
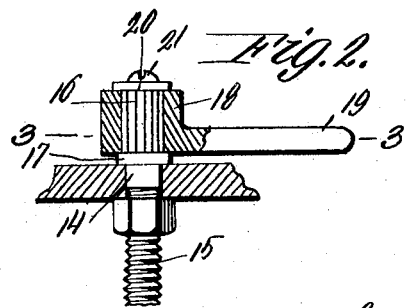
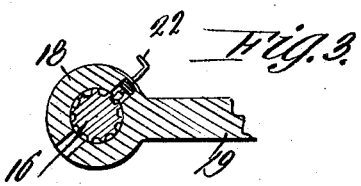
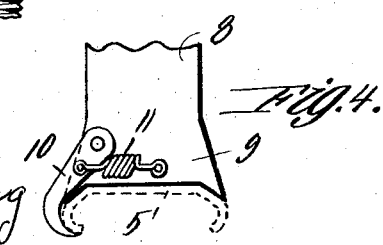
WITNESSES
Inventor
FRANK BOOTH
By Richard B. Owen
Attorney

UNITED STATES PATENT OFFICE.

FRANK BOOTH, OF SAFFORD, ARIZONA.

COMBINATION TIRE RACK AND CHANGER.

1,418,279. Specification of Letters Patent. Patented June 6, 1922.

Application filed October 11, 1920. Serial No. 416,143.

*To all whom it may concern:*

Be it known that I, FRANK BOOTH, a citizen of the United States, residing at Safford, in the county of Graham and State of Arizona, have invented certain new and useful Improvements in Combination Tire Racks and Changers, of which the following is a specification.

This invention consists of a combined tire rack and changer, having for its primary object the provision of suitable means for supporting a spare tire on a vehicle, the means also capacitating as a tool for collapsing the tire rim to facilitate mounting or unmounting of the tire.

Another object of the invention is to provide a simple device, which may be conveniently used with standard rims and tires and may also be carried by the vehicle without inconvenience.

The above and other objects of this invention will be in part described and in part understood from the following description of the present preferred embodiment of the invention as illustrated in the accompanying drawings, wherein:

Fig. 1, is a side elevation view of a device constructed in accordance with this invention illustrating its application.

Fig. 2, is a detail fragmentary sectional view showing the manner of connection between the bolt and arms.

Fig. 3, is a detail fragmentary sectional view showing the manner of connection between the bolt and bolt operating lever, and Fig. 4, is a detail fragmentary elevational view of one of the arms illustrating the manner in which it engages the tire rim.

In order to illustrate the application of this invention a tire rim 5 is provided, which is split at 6, and is preferably of a standard configuration. A tire 7 is mounted upon the rim in a manner well known in the art.

The device of this invention consists of a strap bent into a V-shape to provide diverging arms 8, the outer ends of which are enlarged as indicated at 9 and shaped to conform to the contour of the rim 5. Each arm has mounted thereon a pawl 10, which is normally held snugly in engagement with the tire rim by a coil spring 11. One end of the spring is secured to the arm and the opposite end secured to the pawl, as shown to advantage in Fig. 4.

Another arm is provided as indicated at 12 and consists of a strap, the outer end of which is identical in configuration with the outer ends of the arms 8, and is also provided with a pawl 10 of identical configuration with that above described as being connected with each of the arms 8. Lugs 13 extend laterally from the arm 12 and are provided with screw threaded openings.

A bolt 14 is mounted through the apex between the arms 8 and is provided with a threaded shank 15, which extends through the lugs 13 and is in threaded engagement with the openings thereof. The end of the bolt which lies between the arms 8 is provided with a ratchet head 16. An annulus 17 is formed on the bolt between the ratchet head 15 and the apex of the arms 8 as shown to advantage in Fig. 2. This annulus acts as a spacer to retain the head 18 of a ratchet lever 19 disengaged from the apex of said arms 8. Mounted upon the outer end of the ratchet head 16 is a washer 20, which is held in engagement with the head by a screw 21. It will be observed that the washer is superimposed on the lever head 18 to prevent casual displacement of the latter. The lever head has a spring pressed pawl 22 mounted therein for engagement with the ratchet head 16.

Supporting legs 23 are provided, one end of each of which is detachably connected with one of the arms 8, while its opposite end extends laterally into engagement with the chassis 24 of the vehicle, thereby supporting the tire. It will be observed that each leg consists of a bar, one end of which lies snugly in engagement with the arms 8, the opposite end being bent at substantially right angles thereto and projected beyond the periphery of the tire 7. It is of course understood that these legs may be engaged with any part of the vehicle, a portion of the chassis 24 being shown merely to illustrate the application of my invention.

When it is desired to remove the tire from its rim, pressure is exerted upon the ratchet lever 19 to move the latter in the arc of a circle, which correspondingly operates the bolt 14. In view of a jam nut 25, which is mounted upon the screw threaded shank 15 of the bolt and engages the apex of the arms 8, the bolt will be caused to move downwardly through the lugs 13, thereby causing contraction of the arms 8 and 12, causing the rim to break at 6. As soon as the rim has collapsed in this way the tire can be removed in an obvious manner. When it is desired to mount a tire on the rim, this device is mounted again in the rim and the latter snapped in place in a manner well known in the art. It will be apparent from the construction of ratchet lever and pawl shown in Fig. 3, that the said lever is movable in both a clock-wise and counter-clockwise direction for an obvious purpose. If desired, a second pawl, such as that indicated at 22 may be mounted in the opening formed diametrically opposite to that in which the pawl 22 is mounted to permit movement of the bolt in an opposite direction to facilitate expansion of the tire rim for snapping the same into position. Various other changes may be made within the scope of the appended claim.

What is claimed is:

A combination tire rack and changer including a V-shape strap the free ends of which are enlarged for engagement with the inner periphery of a tire rim, a secondary strap one end of which is enlarged for engagement with the tire rim and the opposite end equipped with laterally extending lugs lying parallel with the apex of said V-shape strap, a threaded shank one end of which is engaged with said lugs and the opposite end extended through said apex of the V strap and enlarged to provide a ratchet head, and a ratchet lever mounted on said head to operate the latter substantially as described.

In testimony whereof I affix my signature in presence of two witnesses.

FRANK BOOTH.

Witnesses:
LEE N. STRATTON,
ARTHUR E. O'BRYAN.